W. SHAW.
DIE HEAD.
APPLICATION FILED JAN. 2, 1915.
1,146,354.
Patented July 13, 1915.
3 SHEETS—SHEET 3.
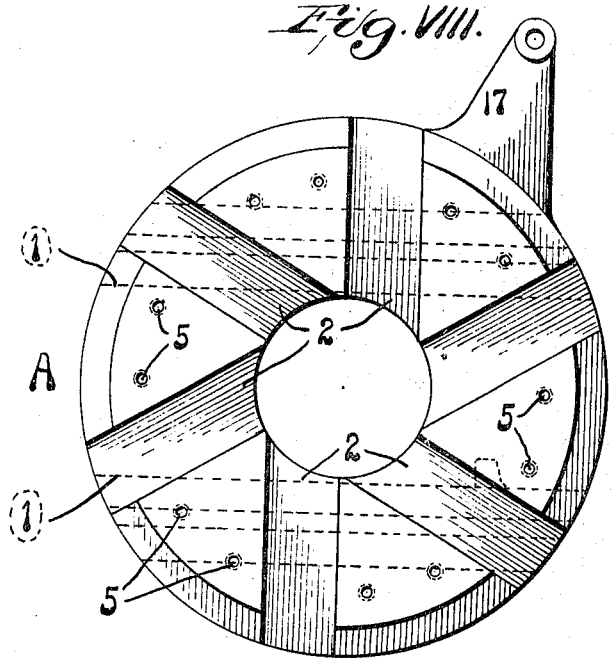
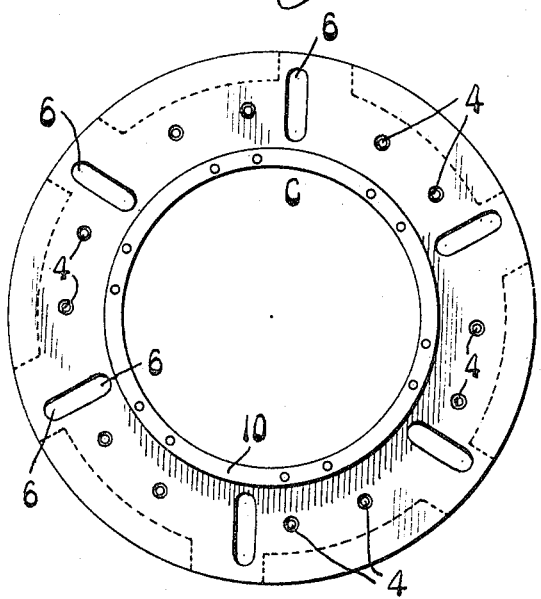
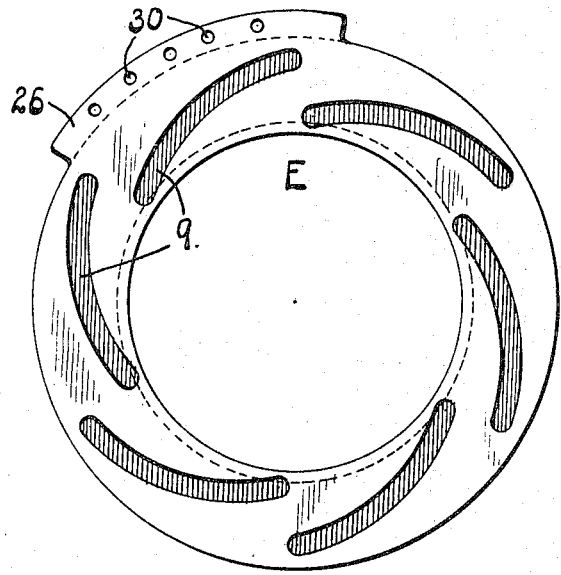

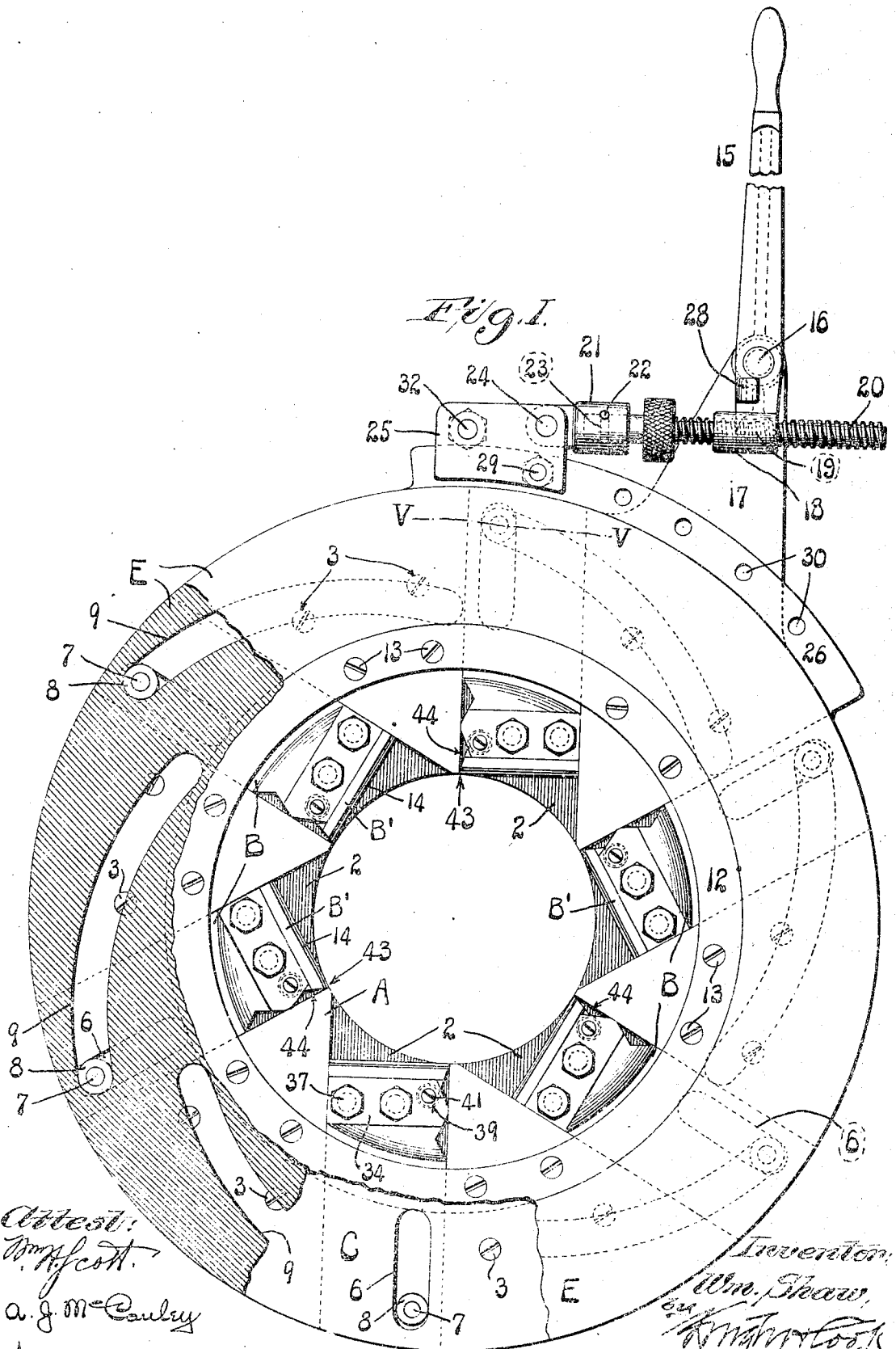

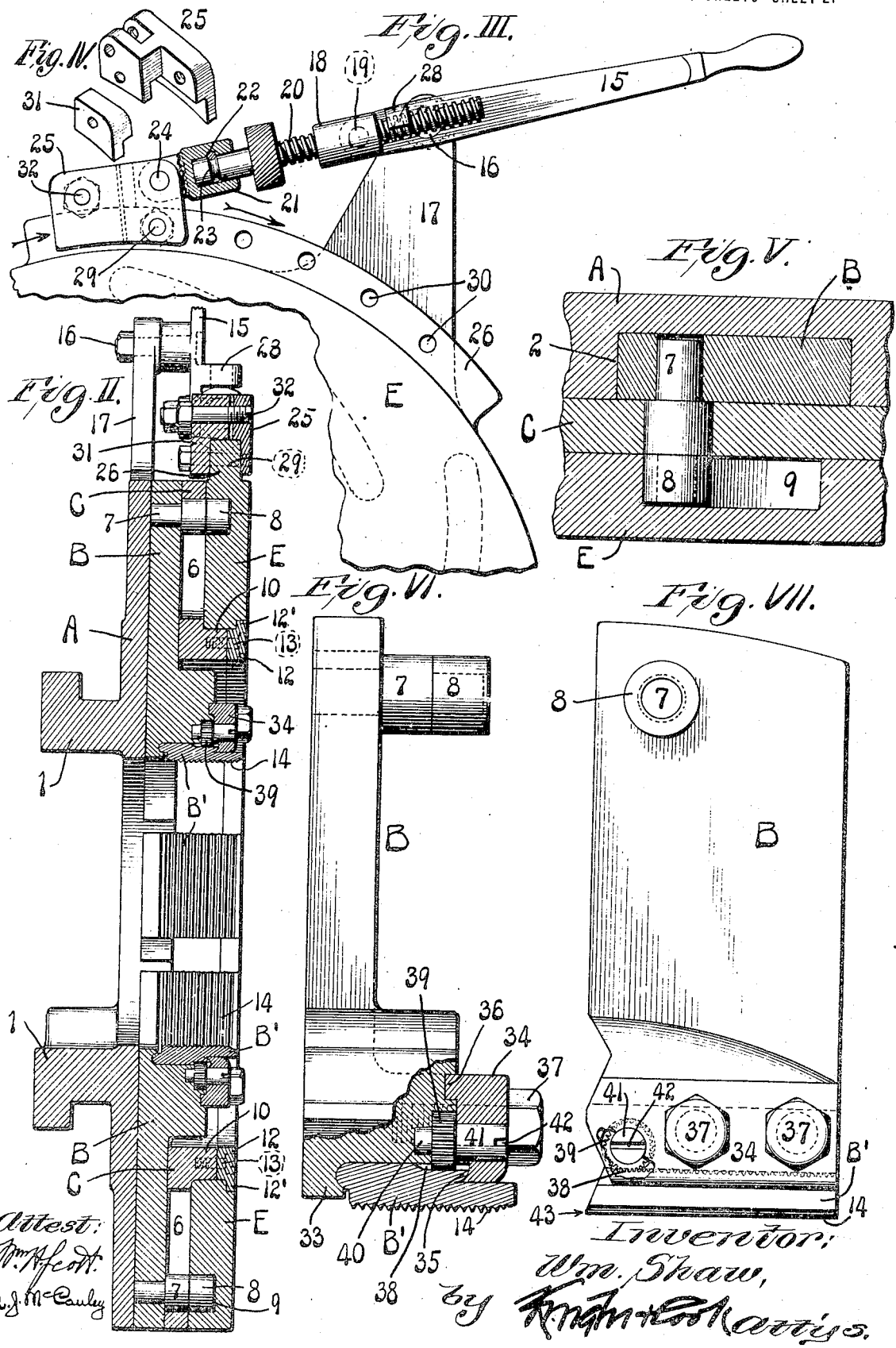

UNITED STATES PATENT OFFICE.

WILLIAM SHAW, OF EDWARDSVILLE, ILLINOIS, ASSIGNOR TO N. O. NELSON MANUFACTURING COMPANY, A CORPORATION OF MISSOURI.

DIE-HEAD.

1,146,354.  Specification of Letters Patent.  Patented July 13, 1915.

Application filed January 2, 1915. Serial No. 109.

*To all whom it may concern:*

Be it known that I, WILLIAM SHAW, a citizen of the United States of America, a resident of Edwardsville, in the county of Madison, State of Illinois, have invented certain new and useful Improvements in Die-Heads, of which the following is a full, clear, and exact description, reference being had to the accompanying drawing, forming a part of this specification.

My invention relates to improvements in die heads for cutting screw threads, one of the objects being to produce a strong, simple and inexpensive device of this kind.

Another object is to provide an improved operating device for moving the cutters toward and away from the work, and the invention also includes certain specific details of construction and certain specific combinations of elements which will be hereinafter described.

Figure I is a front elevation, partly in section, a portion of the annular cam plate being broken away to show the slotted intermediate plate. Fig. II is a vertical section of the device shown in Fig. I. Fig. III is a detail view of the means for rocking the annular cam plate. Fig. IV is a perspective view of the two-part jaw member which forms part of the means for connecting the operating handle to the cam plate. Fig. V is an enlarged transverse section taken on the line V—V, Fig. I. Fig. VI is an enlarged side elevation, partly in section, illustrating one of the cutter holders and a cutter adjustably secured to said holder. Fig. VII is a front elevation of the parts shown in Fig. VI, a portion of the clamp bar being broken away to show the rack and pinion. Fig. VIII is a detail view of the guide plate. Fig. IX is a detail view of the annular intermediate plate. Fig. X is a detail view of the annular cam plate.

A designates a guide plate having lugs 1 (Fig. II) adapted to be secured to a suitable support, and provided with a series of guideways 2 for the reception of a series of cutter holders B.

C designates an annular intermediate plate secured to the guide plate A by means of screws 3 passing through holes 4 (Fig. IX) in the intermediate plate and screwed into threaded apertures 5 (Fig. VIII) in the guide plate A. These two annular plates A and C, connected by the screws 3, constitute a support for the slidable cutter holders B which lie between said plates A and C. The guideways 2 are preferably formed tangentially with respect to a curved line drawn from the axis of the support, and slots 6, formed in the intermediate plate C, are preferably parallel with said guideways. Each cutter holder B is provided with a pin 7 which projects through one of the slots 6 in the intermediate plate C, and a roller 8 is preferably fitted to the outer end of each pin 7.

An annular cam plate E, having cam grooves 9, is rotatably fitted to an annular rib 10 (Figs. II and IX) which projects from the intermediate plate C. This annular cam plate surrounds the annular rib 10, and the latter serves as a support for the cam plate. The means for securing the annular cam plate E to the intermediate plate C, includes a retaining ring 12 and screws 13 connecting said ring to the annular rib 10, see Figs. I and II, said retaining ring 12 having a flange 12' which overlaps the inner margin of the cam ring E.

The rollers 8 are arranged in the cam grooves 9 so that the cam plate E may be rocked with the result of shifting the cutter holders toward and away from the work. In this connection it is to be understood that the article to be threaded passes through the center of the die head, and that each cutter holder carries a cutter B' having cutting teeth 14 which engage the work when the cutters occupy their operative positions.

The means for rocking the cam plate E comprises an operating lever 15 pivoted at 16 to an arm 17 which extends upwardly from the guide plate A. A tubular nut member 18 is pivoted at 19 to the lower end of the operating lever 15, and a connecting screw 20 is screwed into the nut member 18 and rotatably fitted to a socket member 21. The connecting screw 20 is secured to the socket member by a pin 22 passing through the socket member and arranged partly within an annular groove 23 near an end of the connecting screw.

24 designates a pivot pin connecting the socket member 21 to a jaw member 25, the latter being secured to a segmental flange 26 projecting from the rockable cam plate. When the operating lever 15 occupies the position shown in Fig. I, the cutter holders occupy their inoperative positions, and the different cutter holders may be shifted to their operative positions by moving the operating lever from the position shown in Fig. I to the position shown in Fig. III. During the cutting operations the axis of the different pivots 16, 19 and 24 lie on a straight line, or on dead center, as shown in Fig. III, so that the cam plate E cannot rock in response to the pressure on the cutters. This pressure tends to move the cutters away from the work, but to effect a movement of this kind the cam plate must turn in the direction indicated by arrows in Fig. III and such movement is positively prevented by the pivoted operating devices which lie on dead center when the cutters are in service. The operating lever 15 carries a stop member 28 which engages the connecting screw 20 to stop the pivoted parts on dead center as seen in Fig. III. One end of the connecting screw 20 abuts against the socket member 21 so that the end thrusts on the screw 20 are not transmitted through the small pin 22 which connects the screw to the socket member.

The jaw member 25 is secured to the flange 26, on the cam plate, by means of a screw 29 adapted to pass through any one of a series of apertures 30 in said flange. The jaw member 25 is also clamped to the flange 26 through the medium of a clamp block 31 (Figs. II and IV) and a clamp screw 32 passing through said clamp block and screwed into the jaw member 25. The die head may be easily and quickly adjusted by loosening the clamp screw 32, withdrawing the screw 29 from one of the apertures 30, thereby releasing the jaw member from the flange 26, and thereafter inserting the screw 29 through another aperture 30 and then tightening the clamp screw 25. Fine accurate adjustments may be obtained by operating the connecting screw 20.

Each cutter holder B (Figs. VI and VII) has a grooved extension 33 forming a guideway for a cutter B' which is adjustably secured to the cutter holder.

34 designates a clamp bar overlapping a shoulder 35 on the cutter and having a lug 36 which extends into a groove in the cutter holder. Screws 37, passing through the clamp bar 34, are screwed into the cutter holder, and these screws may be adjusted to force the clamp bar into engagement with the cutter B', or they may be loosened to permit the cutter to slide between the clamp bar and the extension 33 (Fig. VI).

Each cutter bar is provided with a row of rack teeth 38 meshing with a pinion 39, the latter having a pair of journals 40 and 41 one of which is rotatably fitted to the cutter holder and the other being rotatably fitted to a clamp bar 34.

The outer end of the journal 41 is provided with a notch 42 for the reception of an adjusting tool whereby the pinion may be rotated to adjust the cutter with respect to the cutter holder. After the cutter has been adjusted to the desired position, by operating the pinion 39, the clamp screws 37 are tightened to clamp the cutter to the cutter holder. Each cutter B' has a cutting edge 43 which lies adjacent to a wall 44 of a guideway 2 when the cutter holders are positioned as shown in Fig. I, and these walls 44 serve as stops for limiting the movement of the cutters when they are adjusted through the medium of pinions 39.

I claim:—

1. A die head comprising cutters, a support for said cutters, and means for moving said cutters toward and away from the center of said support, said means including a rockable member associated with said cutters, an operating lever, and a connecting device securing said operating lever to said rockable member, said connecting device including a connecting member, means for adjustably securing said connecting member to said operating lever, and means for adjustably securing said connecting member to said rockable member, the last mentioned means including a member adapted to be secured in certain fixed positions with respect to said rockable member whereby the parts may be adjusted to certain predetermined positions without changing the adjustment of the means for securing said connecting member to said operating lever.

2. In a device of the character described a cutter holder, a cutter slidably fitted to said cutter holder a clamp bar fitted to said cutter and cutter holder, screws for forcing said clamp bar into engagement with said parts, the cutter being provided with a row of rack teeth, a pinion meshing with said rack teeth, the axis of said pinion being at right angle to the path of movement of said cutter, said pinion being provided with a pair of journals one of which is rotatably fitted to said cutter holder, the other being rotatably fitted to said clamp bar, and the outer end of the last mentioned journal being adapted to receive an adjusting tool whereby the pinion may be rotated.

3. A die head comprising a guide plate having a series of guideways, cutter holders slidably mounted in said guideways, an intermediate plate secured to said guide plate, said intermediate plate being provided with slots which are parallel with said guideways, and the cutter holders being provided with projections which extend through said slots, a cam plate having cams which engage said projections, the intermediate plate being located between said guide plate and cam plate, and means for rocking said cam plate.

4. A die head comprising a guide plate having a series of guideways, cutter holders in said guideways, an intermediate plate secured to said guide plate, said cutter holders being provided with projections which extend through said intermediate plate, a cam plate fitted to said projections, the intermediate plate having an annular rib constituting a support of said cam plate, means for securing said cam plate on said annular rib, and means for rocking said cam plate.

5. A die head comprising a guide plate having a central opening, cutter holders slidably fitted to said guide plate, an intermediate plate secured to said guide plate, the cutter holders being provided with projections which extend through said intermediate plate, a cam plate fitted to said projections, a retaining ring surrounded by said cam plate and secured to said intermediate plate, so as to secure the cam plate to the intermediate plate, and means for rocking said cam plate.

WM. SHAW.

In the presence of—
R. W. VAN HYNING,
G. H. PIERSON.